(12) United States Patent
Kim et al.

(10) Patent No.: US 12,735,130 B2
(45) Date of Patent: Sep. 15, 2026

(54) APPARATUS FOR CONNECTING LOADING PART OF VEHICLE

(71) Applicants: Hyundai Motor Company, Seoul (KR); Kia Corporation, Seoul (KR)

(72) Inventors: Do Hoi Kim, Sejong-si (KR); Hee Dae Oh, Suwon-si (KR); Jung Jong Chun, Seoul (KR); Seong Jae Shin, Uiwang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 588 days.

(21) Appl. No.: 17/903,416

(22) Filed: Sep. 6, 2022

(65) Prior Publication Data

US 2023/0075168 A1 Mar. 9, 2023

(30) Foreign Application Priority Data

Sep. 6, 2021 (KR) ........................ 10-2021-0118187

(51) Int. Cl.

*B62D 63/02* (2006.01)
*B62D 24/00* (2006.01)
*B62D 27/06* (2006.01)
*B62D 21/02* (2006.01)

(52) U.S. Cl.

CPC ........... *B62D 63/025* (2013.01); *B62D 24/00* (2013.01); *B62D 27/06* (2013.01); *B62D 21/02* (2013.01)

(58) Field of Classification Search

CPC .... B62D 24/00; B62D 63/025; B62D 27/023; B62D 27/06

See application file for complete search history.

(56) References Cited

U.S. PATENT DOCUMENTS 5,343,666 A * 9/1994 Haddad ................ B62D 27/026 52/848
6,312,034 B1 * 11/2001 Coleman, II .............. B60R 5/04 296/26.1
6,857,889 B1 * 2/2005 Vitale .................... B62D 24/00 439/269.1
7,287,797 B1 * 10/2007 Belloso .................. B62D 21/03 296/193.07
8,256,829 B2 * 9/2012 Browne ................. B62D 29/00 296/187.02
8,517,423 B1 * 8/2013 Huston ................ B62D 63/025 296/203.02
8,540,272 B1 * 9/2013 Vitale .................. B62D 47/003 280/638
10,479,427 B2 * 11/2019 Scaringe .................. B60K 1/04
10,759,480 B2 * 9/2020 Moos ................... B62D 27/023
11,091,211 B1 * 8/2021 Ebrahimi Afrouzi .. B62D 63/02

(Continued)

FOREIGN PATENT DOCUMENTS

DE 102017216779 A1 * 3/2019 ............... B60K 1/04
DE 102018203120 A1 * 9/2019 ........... B62D 33/077
KR 20130052244 A 5/2013

*Primary Examiner* — Emma K Frick
(74) *Attorney, Agent, or Firm* — Slater Matsil, LLP

(57) ABSTRACT

An embodiment apparatus includes a loading part of a vehicle, a drone unit connected with the loading part and configured to apply a driving force of the vehicle, a connecting unit positioned on a lower side of the loading part and connected with a part of an upper side of the drone unit, and a receiving unit positioned on the upper side of the drone unit and corresponding to the connecting unit.

20 Claims, 6 Drawing Sheets

(56) References Cited

U.S. PATENT DOCUMENTS 11,124,245 B2 * 9/2021 Grottke ................ B62D 21/157
11,144,057 B1 * 10/2021 Ebrahimi Afrouzi .... G06N 3/08
11,167,807 B2 * 11/2021 Kim ....................... B62D 25/06
11,338,864 B2 * 5/2022 Carlden ............... B62D 27/023
11,465,545 B2 * 10/2022 Glatfelter ............. B62D 63/025
11,541,936 B1 * 1/2023 Lutz ..................... B62D 65/024
11,541,937 B2 * 1/2023 Cho ....................... B62D 33/08
11,648,985 B2 * 5/2023 Hwang .................. G01D 5/145
296/193.03
11,648,989 B2 * 5/2023 Custer .................... B62D 27/06
280/727
11,673,614 B2 * 6/2023 Moarefi ................. B33Y 80/00
296/35.1
11,989,033 B2 * 5/2024 Georgeson ........... B62D 47/006
12,005,979 B2 * 6/2024 Moarefi ............... B62D 63/025
12,071,188 B2 * 8/2024 Kwon .................. B62D 63/025
12,179,602 B2 * 12/2024 Lee ........................ B62D 21/12
12,214,835 B2 * 2/2025 Bollinger ................. B60K 1/04
2020/0140021 A1 * 5/2020 Grottke ................ B62D 25/025
2021/0331749 A1 * 10/2021 Hwang .................. B62D 65/04
2022/0274658 A1 * 9/2022 Kägi .................... B62D 65/022
2023/0009002 A1 * 1/2023 Moarefi .................. B60P 1/649
2024/0025501 A1 * 1/2024 Wu ...................... B62D 63/025
2024/0124077 A1 * 4/2024 Cha ........................ B62D 25/06
2024/0166280 A1 * 5/2024 Lee ........................ B62D 33/04
2024/0199151 A1 * 6/2024 Subramanian ...... E05F 15/6907
2024/0326918 A1 * 10/2024 Oguzcan Ger ........ B62D 24/00
2024/0326920 A1 * 10/2024 Sun .................... B62D 25/2036

* cited by examiner

- ROOM TEMPERATURE STATE -

APPARATUS FOR CONNECTING LOADING PART OF VEHICLE

CROSS-REFERENCE TO RELATED APPLICATIONS

This application claims the benefit of Korean Patent Application No. 10-2021-0118187, filed on Sep. 6, 2021, which application is hereby incorporated herein by reference.

TECHNICAL FIELD

The present disclosure relates to an apparatus for connecting a loading part of a vehicle.

BACKGROUND

In general, coupling of a chassis frame and wheels of a commercial vehicle is implemented with a leaf spring structure for ease in driving and safety.

A loading box of a certain size in which loads such as boxes are loaded is usually placed on the upper side of the chassis frame. When the loading box is separated and is moved to a storage place, the height of the loading box from the ground needs to be lowered as much as possible so that the loads in the loading box may be more easily transported to the storage place.

However, when the loading box is separated from the chassis frame, in order to consider the naturally rising height of the chassis frame of the commercial vehicle and avoid mutual interference between the upper end of the vehicle frame and the lower end of the loading box upon removal, the upper end of the frame and the lower end of the loading box of the commercial vehicle need to be excessively spaced apart from each other. In particular, even when the loading box is placed on the upper part of the chassis frame or the loading box is separated from the chassis frame, an outrigger needs to be excessively spaced apart so as to avoid mutual interference, and thus, there is a problem in that the space occupied by the loading box is excessive, specifically, in a distribution center where a space is limited, etc.

Recently, as an autonomous vehicle, a drone unit which applies a driving force has been developed, and a structural feature capable of performing connection between the drone unit and a loading box is essentially required.

Korean Patent Application Laid-Open No. 10-2013-0052244 provides information related to the present subject matter.

SUMMARY

The present disclosure relates to an apparatus for connecting a loading part of a vehicle. Particular embodiments relate to an apparatus for connecting a loading part of a vehicle, including a loading part positioned on the upper side of an autonomous driving drone applying a driving force to the vehicle, which includes a connecting unit and a receiving unit configured to allow the loading part and the drone to be selectively connected.

Embodiments of the present disclosure can solve problems associated with the related art, and an embodiment of the present disclosure provides an apparatus for connecting a loading part of a vehicle capable of performing connection between a drone capable of performing autonomous driving and the loading part.

Further, embodiments of the present disclosure provide a multi-locking structure between a connecting unit and a receiving unit through the apparatus for connecting a loading part of a vehicle.

The embodiments of the present disclosure are not limited to the aforementioned embodiments, and other embodiments of the present disclosure not mentioned may be understood by the following description and seen by exemplary embodiments of the present disclosure more clearly. Further, the embodiments of the present disclosure may be achieved by a means described in the claims and a combination thereof.

An apparatus for connecting a loading part of a vehicle according to embodiments of the present disclosure includes the following configuration.

As an exemplary embodiment of the present disclosure, an apparatus for connecting a loading part of a vehicle includes a loading part having positioned therein loads, a drone unit connected with the loading part and configured to apply a driving force of the vehicle, a connecting unit positioned on a lower side of the loading part and configured to be connected with at least a part of an upper side of the drone unit, and a receiving unit positioned on the upper side of the drone unit to correspond to the connecting unit.

Further, the apparatus for connecting the loading part of the vehicle in which the connecting unit further includes an upper side pipe positioned on a lower surface of the loading part and a guide part protruding from a lower surface of the upper side pipe and configured to be inserted into the receiving unit.

Further, in the apparatus for connecting the loading part of the vehicle the receiving unit further includes a lower side pipe positioned on a lower side of the upper side pipe in a state in which the connecting unit is connected and a slot part positioned in the lower side pipe and configured to receive the guide part.

Further, in the apparatus for connecting the loading part of the vehicle the guide part further includes an extension part configured to extend along the lower surface of the upper side pipe, an engagement part vertically connected to the extension part and positioned in the slot part, and a variable part configured to surround outer surfaces of the extension part and the engagement part and to be changed in volume at a predetermined position depending on a temperature.

Further, the apparatus for connecting the loading part of the vehicle further includes a bolt part positioned along a lengthwise direction of the engagement part and configured to be connected with at least a part of the receiving unit.

Further, in the apparatus for connecting the loading part of the vehicle a cross-section of the variable part in a lengthwise direction is configured to increase from one end in contact with the receiving unit to the other end.

Further, in the apparatus for connecting the loading part of the vehicle the variable part is configured to have a tapered shape along a lengthwise direction of the guide part.

Further, the apparatus for connecting the loading part of the vehicle further includes at least one uneven part positioned inside the slot part facing the variable part.

Further, in the apparatus for connecting the loading part of the vehicle, at a set or higher temperature, a volume of the variable part surrounding the outer surface of the engagement part is contracted, so that connection between the connecting unit and the receiving unit is released.

Further, in the apparatus for connecting the loading part of the vehicle, at the set or higher temperature, a volume of the variable part surrounding the outer surface of the extension part is expanded, so that connection between the connecting unit and the receiving unit is released.

Embodiments of the present disclosure may obtain the following effects by the aforementioned exemplary embodiments and the configuration, coupling, and use relationship to be described later.

Embodiments of the present disclosure may provide a multi-locking effect between a drone unit and a loading part through a connecting apparatus of the loading part positioned on the upper surface of the drone unit.

Embodiments of the present disclosure may provide the effect of providing the connecting unit which may be easily disconnected depending on a temperature range through a variable part positioned in a guide part.

Moreover, embodiments of the present disclosure may provide a double locking structure by the variable part and a bolt, and therefore, may provide the effect of maintaining high connecting force between the guide part and a slot part.

DETAILED DESCRIPTION OF ILLUSTRATIVE EMBODIMENTS

Figure 1:
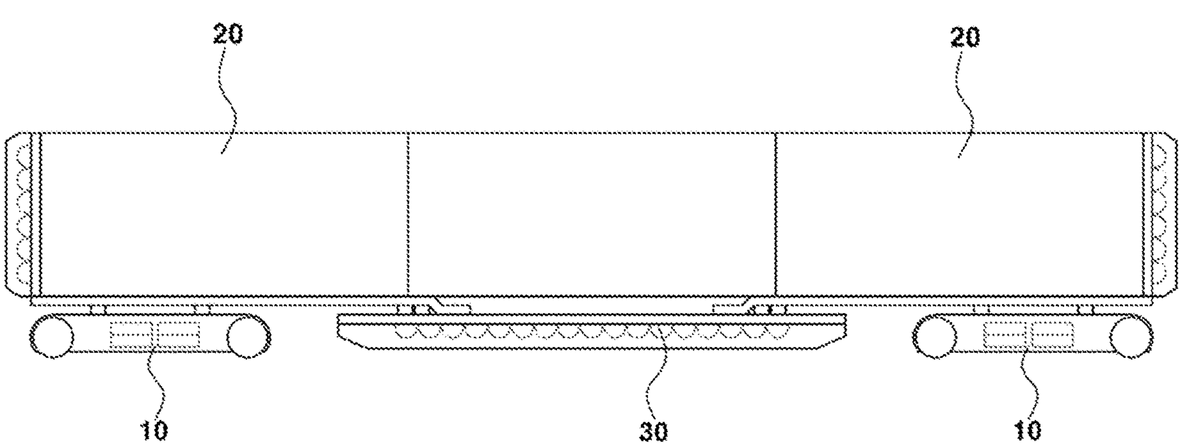
FIG. 1 illustrates a commercial vehicle including an apparatus for connecting of the loading part of a vehicle as an exemplary embodiment of the present disclosure.

Hereinafter, embodiments of the present disclosure will be described in more detail with reference to the accompanying drawings. The embodiments of the present disclosure may be modified in various forms, and the scope of the present disclosure should not be construed as being limited to the following embodiments. The present embodiments are provided to more fully explain the present disclosure to those skilled in the art.

Further, terms such as "... part", "... unit", and "... module" described in the specification mean a unit that processes at least one structure or function, and these may be implemented by hardware or software, or a combination of hardware and software.

A shape memory alloy described in the specification is changed to an original state at a set or higher temperature. Thus, the shape memory alloy refers to all metals including physical properties that a volume is decreased in an original state as compared to a deformed state.

A room temperature state of a variable part may be interpreted to mean a state in which a volume-expended deformation state is maintained.

Further, the room temperature state in embodiments of the present disclosure means a temperature range that may include all temperature conditions including a normal driving environment.

Further, in embodiments of the present disclosure, a method of heating the variable part may include a method of applying power from a battery positioned in a vehicle or a method of performing heating through high temperature cooling water or oil, etc. from the vehicle.

Hereinafter, the exemplary embodiments will be described in detail with reference to the accompanying drawings, and in describing the exemplary embodiments with reference to the accompanying drawings, the same or corresponding components are denoted by the same reference numerals and overlapping descriptions thereof will be omitted.

Figure 2:
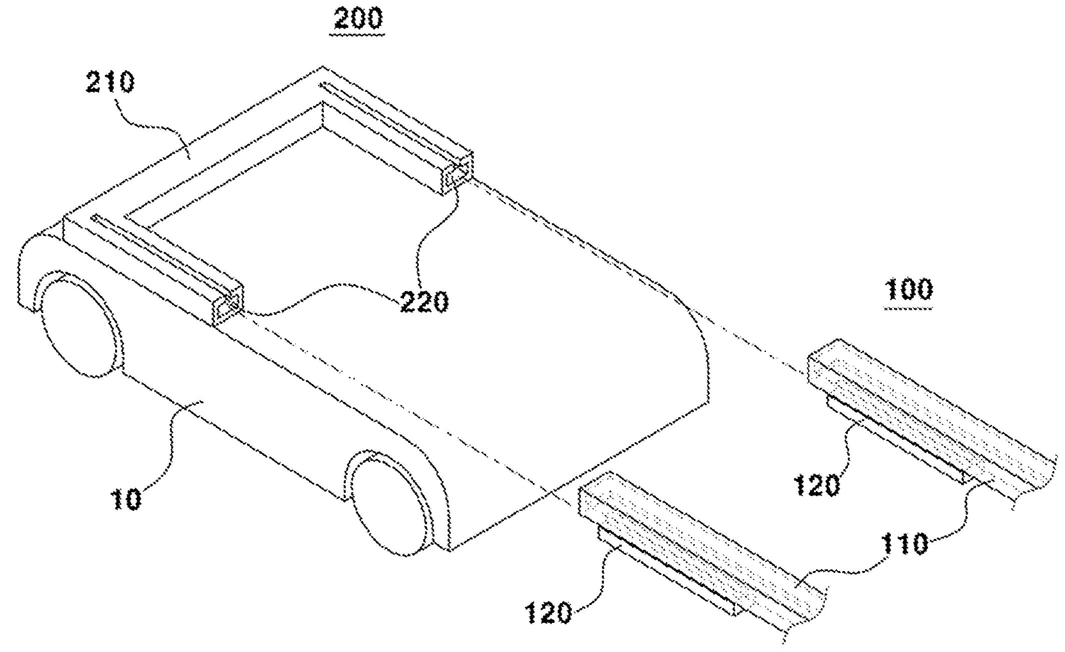
FIG. 2 illustrates the configuration of a connecting unit and a receiving unit as an exemplary embodiment of the present disclosure.

As illustrated in FIGS. 1 and 2, embodiments of the present disclosure relate to an apparatus for connecting a loading part 20 of a vehicle, and relate to a commercial vehicle which is configured such that a drone unit 10 capable of performing autonomous driving and a loading part 20 may be selectively connected.

The drone unit 10 may apply a driving force through the operation of a fuel cell, and at least one drone unit 10 may be positioned on the lower end of the loading part 20. More preferably, the drone unit 10 may be driven using a fuel cell system and a high voltage battery, and may be configured such that fuel is applied to the drone unit 10 through a hydrogen storage tank 30 connected to an upper side pipe positioned on the lower end of the loading part 20. The drone unit 10 may be configured by a vehicle capable of autonomous driving, and may be configured as an unmanned vehicle without a seat.

A connecting unit 100 configured to be capable of being connected with the drone unit 10 is included at the lower side of the loading part 20. The connecting unit 100 includes an upper side pipe 110. The upper side pipe 110 may be configured as a chassis frame of the vehicle. A guide part 120 which is configured such that at least a part of the guide part 120 is capable of being inserted into the drone unit 10 is disposed at the lower surface of the upper side pipe 110.

Figure 3:
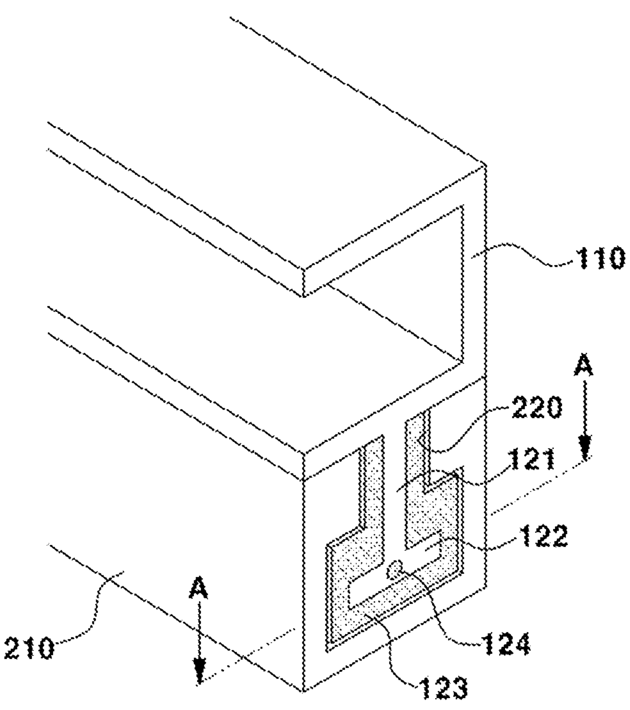
FIG. 3 illustrates the configuration in a state in which the connecting unit and the receiving unit are connected as an exemplary embodiment of the present disclosure.

As illustrated in FIG. 3, the guide part 120 includes an extension part 121 configured to extend along the lower surface of the upper side pipe 110. The end of the extension part 121 includes an engagement part 122 configured to be parallel to the lower surface of the upper side pipe 110. More preferably, the engagement part 122 is configured to be formed perpendicularly to the extension part 121.

A variable part 123 configured to surround at least a part of the engagement part 122 and at least a part of the extension part 121 is included. The variable part 123 is configured to be varied in a volume in response to a temperature. More preferably, the variable part 123 may be made of a shape memory alloy and is configured to be minimized in its volume (an original state) at a reference or higher temperature. That is, when the volume of the variable part 123 is minimized, the connecting unit 100 positioned on the loading part 20 is configured to be capable of being separated from the receiving unit 200 positioned on the drone unit 10.

The receiving unit 200 is positioned on the upper surface of the drone unit 10. More preferably, the receiving unit 200 includes a lower side pipe 210 positioned on both sides and the front side of the drone unit 10. The lower side pipe 210 includes a slot part 220 into which the guide part 120 formed on the lower end of the upper side pipe 110 is inserted. The slot part 220 is configured as a slot extending in a lengthwise direction to correspond to the shape of the guide part 120, such that the extension part 121 and the engagement part 122 of the guide part 120 are inserted into the slot. Moreover, the guide part 120 may be inserted into the slot part 220. In the original state in which the guide part 120 is at the set or higher temperature, the variable part 123 is configured to be inserted into the slot part 220 by being separated from the inner side of the slot part 220.

Referring to FIG. 2, the drone unit 10 positioned at the front of the vehicle is illustrated.

In correspondence to the connecting unit 100 of the loading part 20, the receiving unit 200 is disposed on the upper side of the drone unit 10. The receiving unit 200 includes the slot part 220 configured to allow the guide part 120 to be introduced therein. In the minimum volume state of the variable part 123, the guide part 120 is configured to be capable of being introduced into the slot part 220. At a room temperature condition, the variable part 123 expands to have a volume larger than a volume formed by the inner wall of the slot part 220.

As such, it is possible to strengthen the connecting relationship between the connecting unit 100 and the receiving unit 200 through the volume expansion of the variable part 123.

FIG. 3 illustrates a state in which the receiving unit 200 and the connecting unit 100 of the apparatus for connecting the loading part 20 are connected as an exemplary embodiment of the present disclosure.

When the guide part 120 of the connecting unit 100 is introduced into the slot part 220 of the receiving unit 200, the variable part 123 is configured to maintain the minimum volume state (the original state). More preferably, in the exemplary embodiment of the present disclosure in which the variable part 123 is made of the shape memory alloy, when the temperature of the variable part 123 is raised to a predetermined or higher temperature, the volume of the variable part 123 is minimized, and returns to the original state. Therefore, after heating of the guide part 120 or the variable part 123 of the connecting unit 100 is performed, the guide part 120 is configured to be inserted into the slot part 220.

In the inserted state, the guide part 120 may be configured to be spaced apart from the inner surface of the slot part 220 by a predetermined distance, and when the guide part 120 has a room temperature, the inner surface of the slot part 220 and the outer surface of the variable part 123 change into a pressurized state.

More preferably, the variable part 123 configured to surround one lengthwise end of the extension part 121 is configured such that a separation amount by which the variable part 123 is spaced apart from the inner surface of the slot part 220 in the room temperature state is smaller than a separation amount by which the variable part 123 is spaced apart from the inner surface of the slot part 220 in the original state. The variable part 123 configured to surround the engagement part 122 is spaced apart from the inner surface of the slot part 220 in the original state, and is varied in its volume in the room temperature state so as to pressurize the inner surface of the slot part 220.

A bolt part 300 positioned inside a connecting bolt groove 124 formed along the lengthwise direction of the engagement part 122 is included. The bolt part 300 is configured to pass through the connecting unit 100 in the lengthwise direction thereof. Further, a receiving bolt groove 310 is included so that the front end of the bolt part 300 may be inserted into at least a part of the inner surface of the receiving unit 200.

Therefore, the bolt part 300 passes through the connecting unit 100 along the connecting bolt groove 124 formed in the engagement part 122 or at a position where the engagement part 122 and the extension part 121 face each other, and is locked in the receiving bolt groove 310, by which the connecting unit 100 and the receiving unit 200 may be integrally locked to each other.

Figure 4:
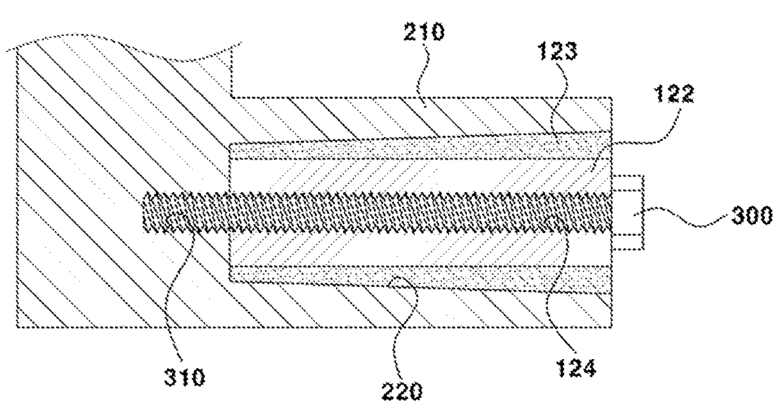
FIG. 4 illustrates a cross-sectional view taken along a line A-A of FIG. 3 in the state in which the connecting unit and the receiving unit are connected as an exemplary embodiment of the present disclosure.
Figure 4:
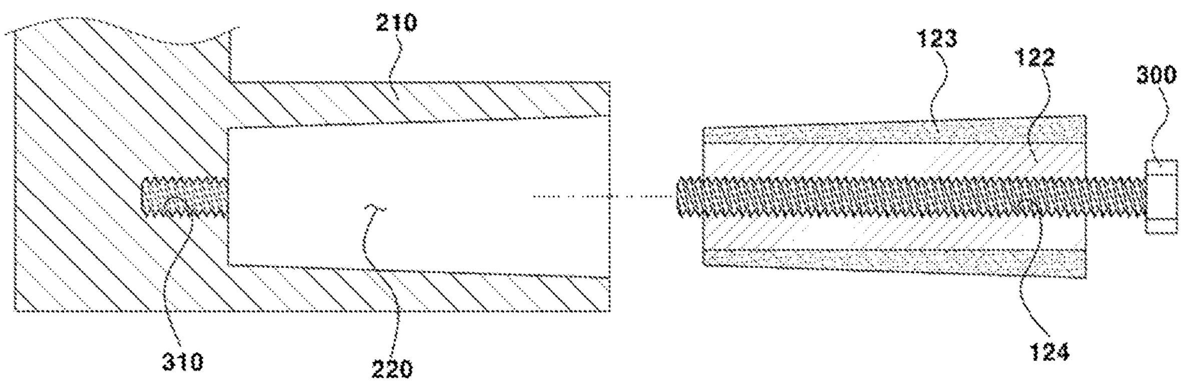

FIG. 4 illustrates a cross-sectional view in a state in which the connecting unit 100 and the receiving unit 200 are connected as an exemplary embodiment of the present disclosure.

Observing the illustrated cross-section, the connecting unit 100 is configured to be inserted inside of the receiving unit 200, and includes the bolt part 300 which is configured to pass through the guide part 120. The bolt part 300 is inserted into an inner bolt hole of the engagement part 122 of the guide part 120 to be moved in the lengthwise direction along a thread formed on the inner circumferential surface of the inner bolt hole.

The end of the bolt part 300 is configured to be inserted into the receiving bolt groove 310 which is formed in the inner wall surface of the receiving unit 200. More preferably, the bolt part 300 performs movement in the lengthwise direction along the thread formed inside the receiving bolt groove 310.

A vertical part configured to come in contact with the outer circumferential surface of the bolt part 300 is included, and the inner surface of the engagement part 122 includes the connecting bolt groove 124 which has a threaded shape. Moreover, the connecting bolt groove 124 may be formed along the guide part 120 in the lengthwise direction at a position where the engagement part 122 and the extension part 121 face each other.

The variable part 123 configured to surround the outer surfaces of the engagement part 122 and extension part 121 is included. The variable part 123 is configured such that the widthwise length of one end of the variable part 123 close to the inner surface of the receiving unit 200 is shorter than the widthwise length of the other end of the variable part 123 farthest from the receiving unit 200. More preferably, at least one outer surface of the outer cross-section of the variable part 123 is configured as a tapered shape.

The variable part 123 having a quadrangular cross-sectional shape along a vertical direction is configured such that the width between two opposite surfaces gradually increases along the lengthwise direction spaced apart from the receiving unit 200. More preferably, the width of the cross-section of the variable part 123 having the quadrangular cross-sectional shape gradually increases from the one end thereof in contact with the receiving unit 200 in the lengthwise direction. Therefore, as illustrated in the cross-section A-A, the variable part 123 is configured to have a width gradually increasing from the one end thereof in contact with the receiving unit 200 in the lengthwise direction.

Moreover, in correspondence to the above-described shape, the slot part 220 of the receiving unit 200 is also configured to have an inclination corresponding to a change in the width of the outer surface of the variable part 123 along the lengthwise direction.

Figure 5A:
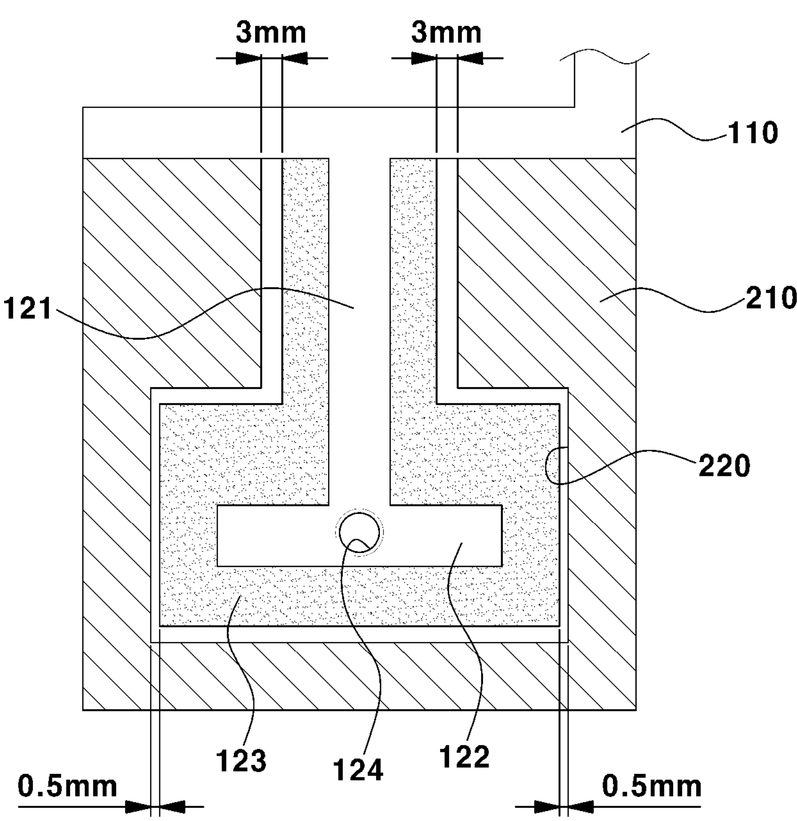
FIG. 5A illustrates a connecting relationship between a variable part of the connecting unit and the receiving unit at a set or higher temperature as an exemplary embodiment of the present disclosure.

FIG. 5A illustrates a gap between the inner wall surface of the receiving unit 200 and the variable part 123 according to a temperature change state of the variable part 123 as an exemplary embodiment of the present disclosure.

As illustrated in FIG. 5A, when the temperature of the variable part 123 which is made of the shape memory alloy is raised to the set or higher temperature to convert the variable part 123 into the original state, the variable part 123 configured to surround the engagement part 122 is configured to have a gap from the inner wall surface of the slot part 220 of the receiving unit 200. Moreover, at the set or higher temperature, the volume of the variable part 123 surrounding the outer surface of the engagement part 122 is decreased, and the volume of the variable part 123 configured to surround the extension part 121 is increased. Therefore, the variable part 123 is configured to be positioned inside the slot part 220 even when a volume changes in response to a temperature change.

The volume change of the variable part 123 configured to surround the extension part 121 and the volume change of the variable part 123 configured to surround the engagement part 122 are the same as each other, so that the total volume of the variable part 123 may be kept constant. Moreover, the variable part 123 is configured to be capable of being varied in the volume thereof depending on a position. Through this, the movement of the connecting unit 100 and the receiving unit 200 in the lengthwise direction is made possible, and thus, the guide part 120 may be moved along the inner surface of the slot part 220.

Figure 5B:
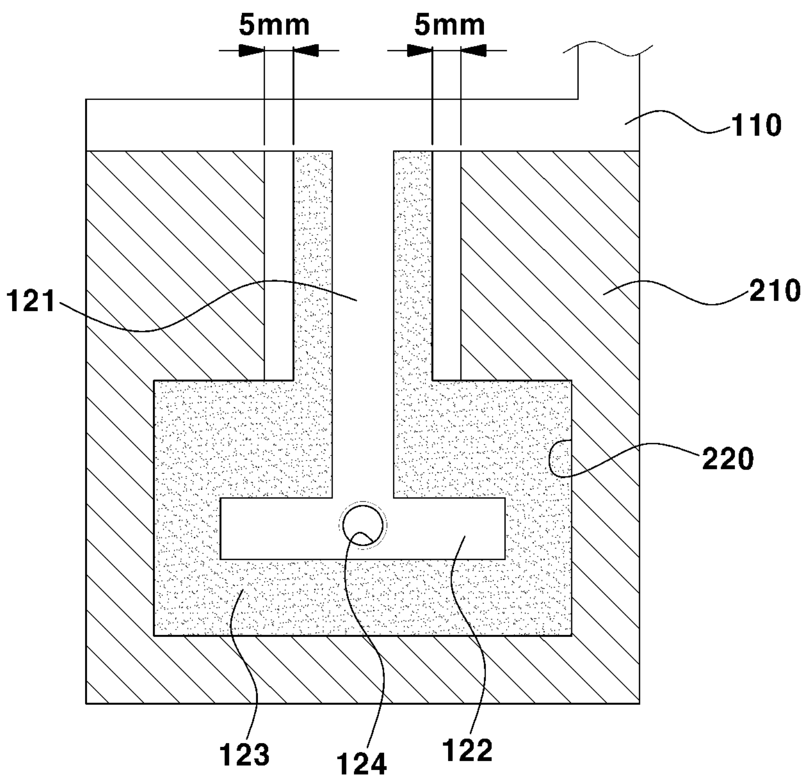
FIG. 5B illustrates a connecting relationship between the variable part of the connecting unit and the receiving unit at a room temperature state as an exemplary embodiment of the present disclosure.

In comparison with this, FIG. 5B illustrates a state in which the volume of the shape memory alloy is increased (changed) in the room temperature state.

As illustrated in FIG. 5B, the variable part 123 positioned on the inner surface of the slot part 220 and configured to surround the extension part 121 may be positioned to have a smaller volume as compared to the state of FIG. 5A. Moreover, the variable part 123 configured to surround the engagement part 122 is converted into a zero-touch state with respect to the inner surface of the slot part 220. That is, according to the expansion of the volume, the variable part 123 positioned on the lower end of the slot part 220 is configured to pressurize the inner surface of the slot part 220. Therefore, the clearance between the connecting unit 100 and the receiving unit 200 may be prevented in the lengthwise direction.

As such, the variable part 123 configured to surround the extension part 121 may be positioned by being spaced apart from the inner surface of the slot part 220 regardless of a change in volume. The variable part 123 configured to surround the engagement part 122 is spaced apart from the inner surface of the slot part 220 or is converted into a state capable of pressurizing the inner surface of the slot part 220, in response to the change in volume.

Moreover, as illustrated in FIGS. 5A and 5B, the width of the variable part 123 configured to surround the extension part 121 is configured to be smaller than the width of the variable part 123 configured to surround the engagement part 122. The variable part 123 configured to surround the extension part 121 is configured to have a smaller gap with the inner surface of the slot part 220 in a heated state. On the contrary, the variable part 123 configured to surround the engagement part 122 may be converted to be spaced apart from the inner surface of the slot part 220 at the set or higher temperature, so that a gap may be formed therebetween.

That is, in response to a temperature change, the variable part 123 having a constant volume is configured so that the volume of the region surrounding the engagement part 122 and the volume of the region configured to surround the extension part 121 are increased or decreased oppositely to each other. Therefore, in the room temperature state, the variable part 123 is configured so that in a state in which the variable part 123 is connected to the slot part 220, the variable part 123 surrounding the engagement part 122 pressurizes the inner surface of the slot part 220 to expand the volume.

Figure 6A:
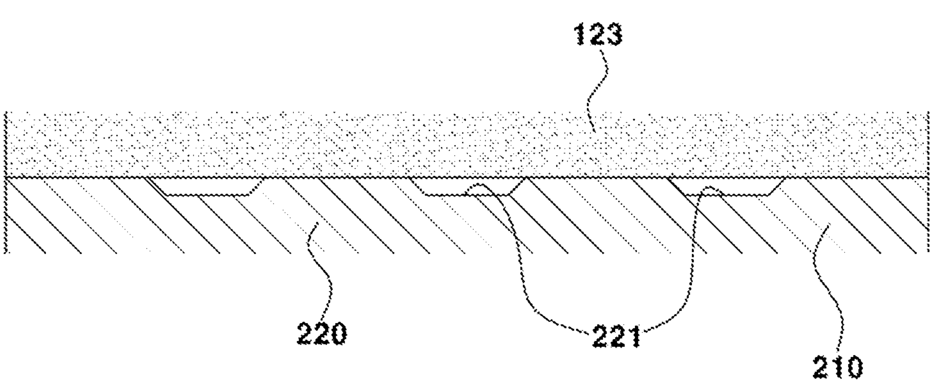
FIG. 6A illustrates a connecting relationship between the variable part of the connecting unit and the inner surface of the receiving unit at the set or higher temperature as an exemplary embodiment of the present disclosure.

FIG. 6A illustrates a side view of performing connection between the inner surface of the slot part 220 and the variable part 123 as the exemplary embodiment of the present disclosure.

As illustrated, at least one uneven part 221 is included on the inner surface of the slot part 220 along at least one direction, and the variable part 123 is configured to be capable of being inserted into the inner side of the uneven part 221. In an exemplary embodiment of the present disclosure, at least one uneven part 221 is configured to be capable of being positioned along the lengthwise direction of the vehicle, and may be positioned along the periphery of the inner surface of the slot part 220 facing the outer surface of the guide part 120.

More preferably, the uneven part 221 may be positioned along the lengthwise direction, or may be formed along a widthwise direction, and may be configured on at least one surface of the inner surface of the slot part 220.

Therefore, in the room temperature state, the volume of the variable part 123 configured to surround the engagement part 122 is expanded so that a part of the variable part 123 is configured to be inserted into the inner side of at least one uneven part 221 to be positioned therein.

Figure 6B:
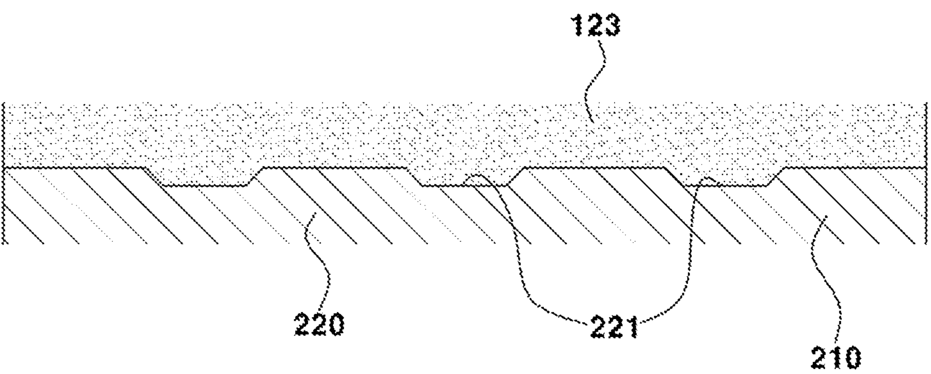
FIG. 6B illustrates a connecting relationship between the variable part of the connecting unit and the inner surface of the receiving unit at the room temperature state as an exemplary embodiment of the present disclosure.

On the contrary, as illustrated FIG. 6B, when the variable part 123 is heated to the set or higher temperature to convert the variable part 123 into the original state, the variable part 123 configured to surround the engagement part 122 is configured to be contracted in the volume thereof, and the outermost surface of the variable part 123 inserted into and positioned in the uneven part 221 is contracted to be spaced apart from the uneven part 221.

When the bolt part 300 is disconnected in the contracted state of the variable part 123 described above, the connecting unit 100 is converted into a state in which it may be easily removed to the outside of the receiving unit 200.

The aforementioned detailed description is illustrative of embodiments of the present disclosure. Further, the aforementioned contents show and describe preferred exemplary embodiments of the present disclosure, and the present disclosure may be used in various other combinations, modifications, and environments. That is, changes or modifications are possible within the scope of the concept of the disclosure disclosed in the present specification, the scope equivalent to the disclosed contents, and/or within the scope of technology or knowledge in the art. The described exemplary embodiments describe the best mode for implementing the technical spirit of the present disclosure, and various changes required in specific application fields and uses of the present disclosure are possible. Therefore, the detailed description of the present disclosure is not intended to limit the present disclosure to the disclosed exemplary embodiments. Further, the appended claims should be construed as including other exemplary embodiments as well.

What is claimed is:

1. An apparatus comprising:

a loading part for a vehicle;

a drone unit configured to provide a driving force for the vehicle, wherein the drone unit and the loading part are connectable to each other;

a connecting unit, which is made of a shape memory alloy, positioned on a lower side of the loading part; and a receiving unit positioned on an upper side of the drone unit and corresponding to the connecting unit, wherein the connecting unit comprises:

an upper side pipe positioned on a lower surface of the loading part; and a guide part protruding from a lower surface of the upper side pipe and insertable into the receiving unit, and wherein the guide part comprises:

an extension part extending along the lower surface of the upper side pipe;

an engagement part vertically connected to the extension part and positionable in a slot part of the receiving unit; and a variable part surrounding outer surfaces of the extension part and the engagement part and configured to change in volume at a predetermined position depending on a temperature.

2. The apparatus of claim 1, wherein the receiving unit comprises a lower side pipe positioned on a lower side of the upper side pipe in a connection state, wherein the slot part is positioned in the lower side pipe and configured to receive the guide part.

3. The apparatus of claim 1, further comprising a bolt part positioned along a lengthwise direction of the engagement part and connectable with a part of the receiving unit.

4. The apparatus of claim 3, wherein the receiving unit further comprises a receiving bolt groove located at an inner wall surface of the receiving unit and configured to receive at least a front end of the bolt part.

5. The apparatus of claim 4, wherein the bolt part is configured to pass through a connecting bolt groove formed in the guide part in the lengthwise direction at a position where the engagement part and the extension part face each other, and wherein the bolt part is configured to move in the lengthwise direction along a thread formed inside the receiving bolt groove of the receiving unit.

6. The apparatus of claim 1, wherein a cross-section of the variable part in a lengthwise direction is configured to increase from a first end in contact with the receiving unit to a second end.

7. The apparatus of claim 1, wherein the variable part has a tapered shape along a lengthwise direction of the guide part.

8. The apparatus of claim 1, further comprising an uneven part positioned inside the slot part facing the variable part.

9. The apparatus of claim 1, wherein, at a set or higher temperature, a volume of the variable part surrounding the outer surface of the engagement part is contracted, so that a connection between the connecting unit and the receiving unit is released.

10. The apparatus of claim 1, wherein, at a set or higher temperature, a volume of the variable part surrounding the outer surface of the extension part is expanded, so that a connection between the connecting unit and the receiving unit is released.

11. An apparatus comprising:

a loading part for a vehicle;

a drone unit configured to provide a driving force for the vehicle, wherein the drone unit and the loading part are connectable to each other;

a connecting unit positioned on a lower side of the loading part; and a receiving unit positioned on an upper side of the drone unit and corresponding to the connecting unit, wherein the connecting unit comprises an upper side pipe positioned on a lower surface of the loading part and a guide part protruding from a lower surface of the upper side pipe and insertable into the receiving unit, wherein the receiving unit comprises a lower side pipe positionable on a lower side of the upper side pipe and a slot part positionable in the lower side pipe and configured to receive the guide part, and wherein the guide part comprises an extension part extending along the lower surface of the upper side pipe, an engagement part vertically connected to the extension part and positionable in the slot part, and a variable part surrounding outer surfaces of the extension part and the engagement part and configured to change in volume at a predetermined position depending on a temperature.

12. The apparatus of claim 11, further comprising a bolt part positionable along a lengthwise direction of the engagement part and connectable with a part of the receiving unit.

13. The apparatus of claim 11, wherein a cross-section of the variable part in a lengthwise direction is configured to increase from a first end in contact with the receiving unit to a second end.

14. The apparatus of claim 11, wherein the variable part has a tapered shape along a lengthwise direction of the guide part.

15. The apparatus of claim 11, further comprising an uneven part positioned inside the slot part facing the variable part.

16. The apparatus of claim 11, wherein a volume of the variable part surrounding the outer surface of the engagement part is able to contract at a set or higher temperature so that a connection between the connecting unit and the receiving unit is released.

17. The apparatus of claim 11, wherein, at a set or higher temperature, a volume of the variable part surrounding the outer surface of the extension part is expanded so that a connection between the connecting unit and the receiving unit is released.

18. The apparatus of claim 11, wherein, at a set or higher temperature, a volume of the variable part surrounding the engagement part is configured to decrease and a volume of the variable part surrounding the extension part is configured to increase.

19. The apparatus of claim 11, wherein a volume change of the variable part surrounding the extension part and a volume change of the variable part surrounding the engagement part are equal to each other, and a total volume of the variable part remains constant in response to a temperature change.

20. The apparatus of claim 11, wherein the variable part is configured to maintain a constant total volume while varying in volume at different positions, and wherein the variable part is configured to enable lengthwise movement between the connecting unit and the receiving unit.

* * * * *